United States Patent
Wegner et al.

(10) Patent No.: US 8,305,238 B2
(45) Date of Patent: Nov. 6, 2012

(54) MAN-MACHINE INTERFACE FOR PILOT ASSISTANCE

(75) Inventors: Matthias Wegner, Friedrichshafen (DE); Thomas Muensterer, Tettnang (DE); Patrick Kramper, Meersburg (DE); Peter Kielhorn, Friedrichshafen (DE)

(73) Assignee: EADS Deutschland GmbH, Ottobrunn (DE)

( * ) Notice: Subject to any disclaimer, the term of this patent is extended or adjusted under 35 U.S.C. 154(b) by 521 days.

(21) Appl. No.: 12/564,587

(22) Filed: Sep. 22, 2009

(65) Prior Publication Data
US 2010/0073198 A1 Mar. 25, 2010

(30) Foreign Application Priority Data
Sep. 23, 2008 (EP) .................................... 08016676

(51) Int. Cl.
G08B 21/00 (2006.01)
(52) U.S. Cl. .................... 340/946; 340/976; 340/953
(58) Field of Classification Search ................ 340/946, 340/948–950, 953, 959–961, 963, 969–976
See application file for complete search history.

(56) References Cited

U.S. PATENT DOCUMENTS

| | | | | |
|---|---|---|---|---|
| 4,827,252 A * | 5/1989 | Busbridge et al. | ............ | 345/427 |
| 6,121,899 A * | 9/2000 | Theriault | ....................... | 340/967 |
| 6,972,696 B2 * | 12/2005 | Rogers et al. | ................. | 340/971 |
| 7,365,652 B2 * | 4/2008 | Scherbarth | .................... | 340/974 |
| 2002/0145543 A1 * | 10/2002 | Hausmann | .................... | 340/975 |
| 2004/0225420 A1 | 11/2004 | Morizet et al. | | |
| 2007/0241936 A1 * | 10/2007 | Arthur et al. | .................. | 340/958 |

FOREIGN PATENT DOCUMENTS

| | | |
|---|---|---|
| DE | 10 2004 051 625 A1 | 5/2006 |
| EP | 1 906 151 A2 | 4/2008 |
| WO | WO 2005/015333 A2 | 2/2005 |

* cited by examiner

*Primary Examiner* — Daniel Previl
(74) *Attorney, Agent, or Firm* — Crowell & Moring LLP

(57) ABSTRACT

A man-machine interface for assisting a pilot during takeoff or landing of an airborne vehicle in reduced external visibility includes a display which represents a virtual scenario from the perspective of a virtual observer who is himself located behind the airborne vehicle and is in the same flight attitude as the airborne vehicle itself. The virtual scenario includes a base plane which symbolizes an idealized ground surface, calculated from the instantaneous value of the altitude above ground and the instantaneous flight attitude data of the aircraft. The base plane is bounded by an artificial horizon and is continuously updated with the instantaneous flying state data and the instantaneous height above ground. The virtual scenario also includes a symbol which represents the airborne vehicle, and the position of the symbol relative to the base plane represents the current flight attitude and the instantaneous height of the airborne vehicle above ground.

8 Claims, 5 Drawing Sheets

MAN-MACHINE INTERFACE FOR PILOT ASSISTANCE

BACKGROUND AND SUMMARY OF THE INVENTION

This application claims the priority of European Patent Application No. 08 016 676.2, filed Sep. 23, 2008, the disclosure of which is expressly incorporated by reference herein.

The invention relates to a man-machine interface (MMI) for pilot assistance during take-off and landing of an airborne vehicle (particularly a helicopter) in reduced external visibility or in restricted visual conditions. In dry, desert-like regions (for example Afghanistan), severe swirling of sand and dust occurs in virtually every off-base landing of helicopters. This is caused by the so-called down wash of the main rotor. The sand and dust swirling often leads to the pilot's partial or total loss of external visibility from the cockpit (so-called brown out) subjecting him or her to the danger of loss of spatial orientation, particularly with regard to the pitch and/or roll angle, as well as inadvertent lateral drift of the aircraft. A similar effect can occur when landing in snow. This effect is referred to as white out.

German patent document DE 10 2004 051 625 A1 discloses a helicopter landing aid specifically for brown out conditions in which a virtual 3D view of the surrounding area is displayed in the perspective of the pilot on a display during the brown out, with the virtual view being generated on the basis of 3D data accumulated during the landing approach, before the brown out started.

International patent document WO 2005/015333 A2 also describes a helicopter landing aid for brown-out conditions, which combines surrounding-area information and flight state data produced by means of different sensors for pilot assistance, and continuously updates this data by means of a helicopter data bus. In this case, both the surrounding-area information on the one hand and the flight state data, such as velocity, movement direction, drift direction and height above ground, on the other hand, are displayed on a joint display.

Characteristic variables and information which are necessary or helpful for the pilot for a landing process in brown-out conditions are:
a) the height above ground,
b) the attitude of the aircraft in space, or with respect to the ground,
c) the movement direction and velocity above ground,
d) the change in the velocity above ground,
e) the change in the height above ground,
f) the obstruction situation at the landing point,
g) the ground character of the landing or touch down point,
h) the distance to and relative direction of a landing or touch-down point which has previously been selected.

One important consideration for a universal, operationally compatible brown-out MMI is that the characteristic variables and information mentioned above must be passed to the pilot or pilots in an intuitive manner. On the other hand, particularly in the case of military helicopters, the pilot is provided with a large amount of information in the form of bars and columns of numbers. In extremely stressful situations, such as during a brown out, where the important factor is to react very precisely and very quickly to a changing flight situation, this may possibly lead to misinterpretations or even confusion by the pilot. For this reason, every display of the characteristic variables and information mentioned above must be presented in a form which is intuitive, and minimizes the stress on the pilot in this critical landing phase.

One object of the invention is to provide and improve a man-machine interface for pilots such that, in the case of a brown-out or white-out landing, he or she is provided with optimized intuitive assistance for three-dimensional orientation, thus allowing a safe landing even and in particular in these extreme situations.

This and other objects and advantages are achieved by the man-machine interface according to the invention, in which a virtual scenario is presented, from the perspective of a virtual observer who is located behind the airborne vehicle and is in the same flight attitude as the airborne vehicle itself. This virtual scenario has the following components:
  a base plane which symbolizes an idealized ground surface, calculated from the instantaneous value of the altitude above ground and the instantaneous flight attitude data. The base plane is bounded by an artificial horizon and is continuously updated with the instantaneous flying state data and the instantaneous height above ground.
  a symbol for the airborne vehicle, whose position and attitude relative to the base plane represents the actual instantaneous flight attitude and the height of the airborne vehicle above ground (AGL).

This display in particular makes it considerably easier for the pilot to control the flight attitude, with regard to pitch and roll, while at the same time providing him with an impression of the height above ground.

In further advantageous embodiments, additional displays can be projected onto the base plane, or onto a plane parallel to it:
  a drift vector on or above the base plane, in order to indicate the instantaneous velocity and movement direction over ground;
  an AGL indicator for visualization of the instantaneous altitude above ground;
  a shadow of the airborne vehicle (on the basis of the current time of day or a fixed virtual light source) for additional visualization of the instantaneous height above ground;
  a danger sector on or above the base plane for visualization of stationary or moving obstructions within the safety area of the landing zone; and
  an intended landing or touch-down point which was chosen before the start of the brown out by a numerical position input or by means of a helmet-mounted sight, flight attitude data or a digital trigger and which is displayed continuously and in an accurate position on the base plane. In one particularly advantageous embodiment, the 3D data relating to the landing zone can also be included in the calculation of the landing point or touch-down point.

The pilot is therefore provided with all the important flight, obstruction and terrain information within the landing zone, in a concentrated form, and he need not divert his attention away from the various displays or screens.

The impression of the instantaneous altitude can be further enhanced by continuously displaying a vertical from the airborne vehicle to the base plane.

In a further embodiment, the base plane has superimposed on it a three-dimensional display of the actual topographical terrain surface (in particular with respect to the conditions in front of, at the side of and under the airborne vehicle), on the basis of high-resolution 3D data.

The display according to the invention can prevent the pilot's loss of spatial orientation in the event of a brown out, and also allow assessment of the desired landing point or touch-down point. The flight attitude, height above ground and, furthermore, instantaneous drift rate and direction as well are in a concentrated form, in a manner which can be understood intuitively by the pilot. The pilot is presented with a universal, operationally compatible aid for helicopter landings, especially in brown-out conditions.

The MMI according to the invention is based on the use of a plurality of sensors (flight attitude and navigation system, one or more radar altimeters and/or laser altimeters) as a basic configuration, as well as additional laser-based ladar systems, video and FLIR cameras and/or dust-penetrating radar systems, as well as digital 3D terrain and obstruction databases as an option.

Other objects, advantages and novel features of the present invention will become apparent from the following detailed description of the invention when considered in conjunction with the accompanying drawings.

DETAILED DESCRIPTION OF THE DRAWINGS

Figure 1:
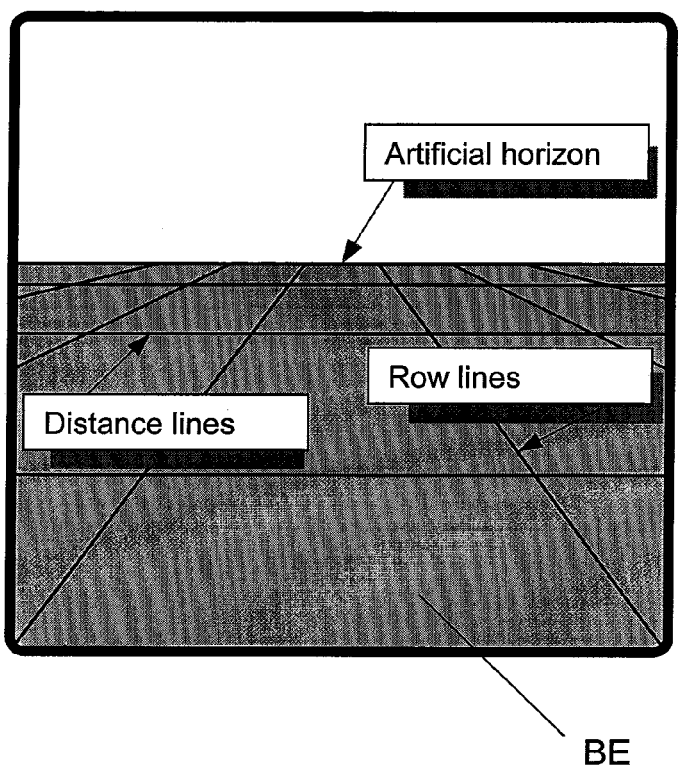
FIG. 1 shows a base plane as a component of the virtual scenario, which is displayed by the MMI according to the invention.

FIG. 1 shows, as a major component of the virtual scenario, a base plane BE which represents the idealized surface of the land plane. The base plane BE is bounded by the artificial horizon which, in principle, has the same functionality as the flight attitude indicator in the cockpit. This is of major importance for the display concept according to the invention, since the artificial horizon and the base plane BE linked to it allow the pilot to read, directly, easily and intuitively, all the flight attitude changes relating to the pitch and/or roll angles.

In order to improve the three-dimensional impression, and in order to assess the instantaneous flight attitude and the qualitative altitude above ground better, row and distance lines can also be shown on the base plane, reinforcing the impression of the three-dimensional depth of the base plane BE. The three-dimensional impression of the virtual scenario, particularly with regard to the assessment of the altitude above ground, can be further enhanced by completely or partially showing on the base plane BE a so-called checkerboard pattern (see FIG. 2) or a graphics ground texture (obtained, for example, from the data from a video camera immediately before the brown out), or both.

All graphics elements on the base plane BE can be updated with the aid of the instantaneous flight state data (flight attitude) and the current height above ground (AGL). This ensures that all the changes in the flight attitude and height above ground result directly in a corresponding change in the graphics display of the base plane BE.

Figure 2:
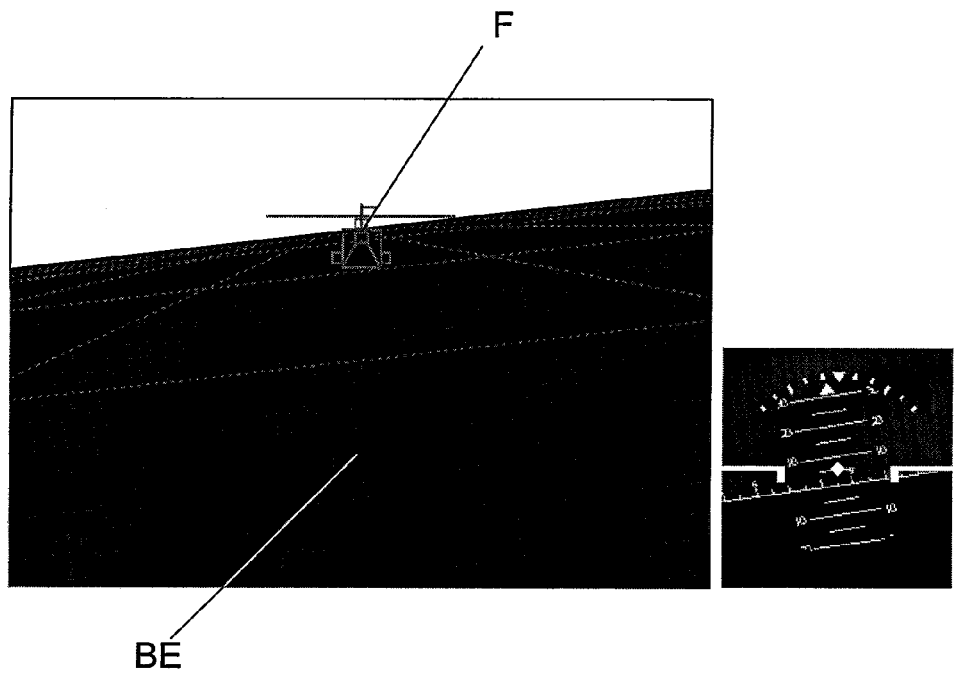
FIG. 2 shows one possible version of the virtual scenario with the base plane BE displayed by the MMI according to the invention, and with the associated flight attitude of the aircraft shown at the bottom on the right, for comparison.

FIG. 2 shows one possible version of the virtual scenario with the base plane BE, as is displayed by the MMI according to the invention. A corresponding display of the flight attitude of the aircraft is likewise shown at the bottom on the right, in the separate diagram. The virtual scenario shows a symbol F for the airborne vehicle above the base plane BE, displayed from the view of a virtual observer who is located behind the airborne vehicle, and in the same flight attitude as the vehicle. The observer can also be envisaged as being rigidly linked to the airborne vehicle. The pilot therefore sees his airborne vehicle from behind, flying above the base plane BE, and taking account of the instantaneous flight state data. This display allows him or her to highly intuitively assess the pitch and roll angle of the airborne vehicle, as well as its height above ground.

Figure 3:
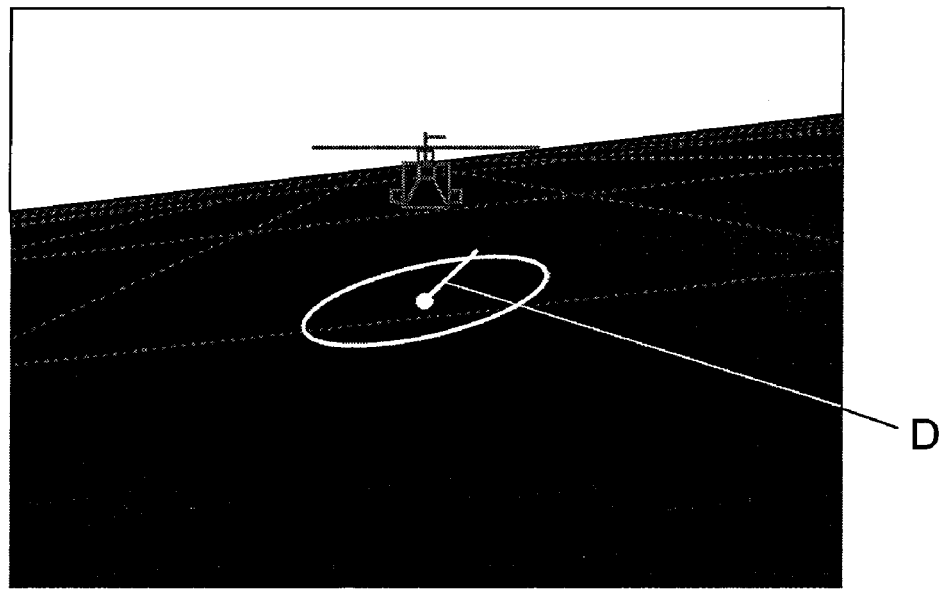
FIG. 3 shows a virtual scenario with a perspective representation of the drift vector D in order to indicate the instantaneous drift rate and relative drift direction over the ground.

In one advantageous embodiment of the invention (FIG. 3), the display can include the drift rate and direction (drift vector) over the ground. The input data for the display is taken from the flight attitude and navigation system. The drift information can be displayed as a perspective projection of the drift vector onto the virtual base plane. In this case, the lateral and longitudinal vector components of the velocity above ground with respect to the aircraft are displayed vectorially as a line or arrow of variable length. The instantaneously displayed length of the drift vector D within the virtual scenario is proportional to the velocity on the horizontal plane, and corresponds at all times to the actual drift rate and direction of the aircraft over the ground.

For better orientation, a perspective projection of a circle can also be overlaid on the base plane BE, with the radius of this circle corresponding to a previously defined drift rate (for example 10 knots), and with the center point being the origin of the drift vector D. One example of a circle such as this on the base plane BE is likewise illustrated in FIG. 3.

Figure 4:
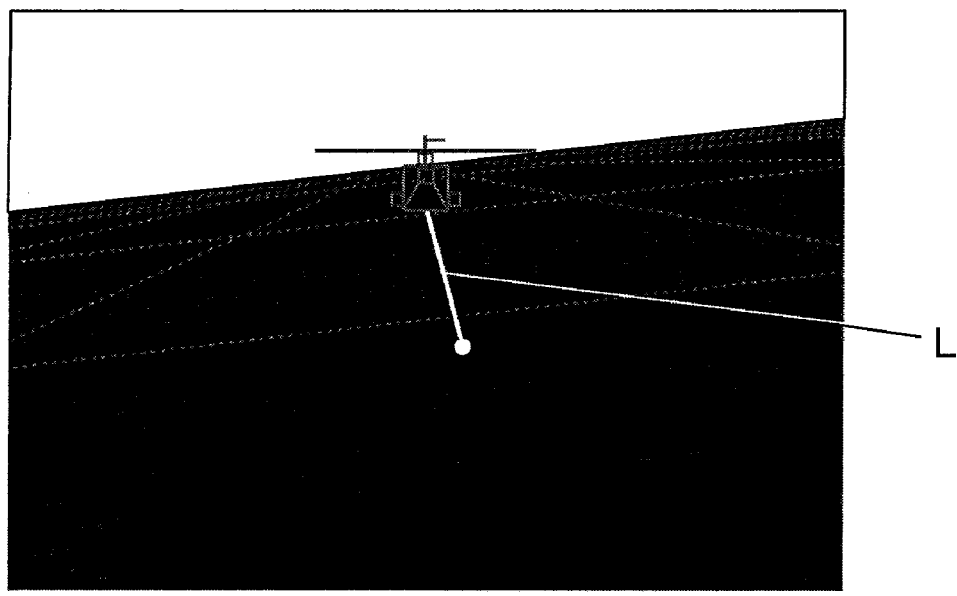
FIG. 4 shows a virtual scenario, displaying the vertical from the aircraft to the base plane BE in order to visualize the instantaneous altitude above ground.

A further functionality of the MMI according to the invention is the display of the current height above ground. On the one hand, this is already displayed implicitly by the display of the airborne vehicle above the base plane BE, and this could be supplemented by the additional display of a vertical L (FIG. 4) from the aircraft on the base plane BE, with the vertical then running from the airborne vehicle to the point vertically below it on the base plane BE.

Figure 5:
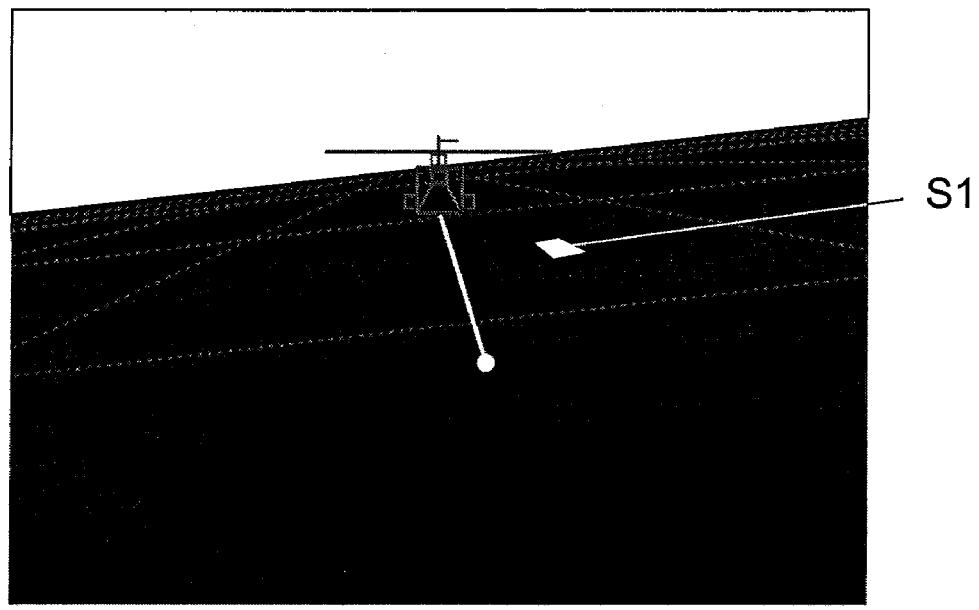
FIG. 5 shows a virtual scenario in the form of two instantaneous views, displaying an airborne vehicle shadow on the base plane as additional assistance to the visualization of the altitude and spatial orientation.
Figure 5:
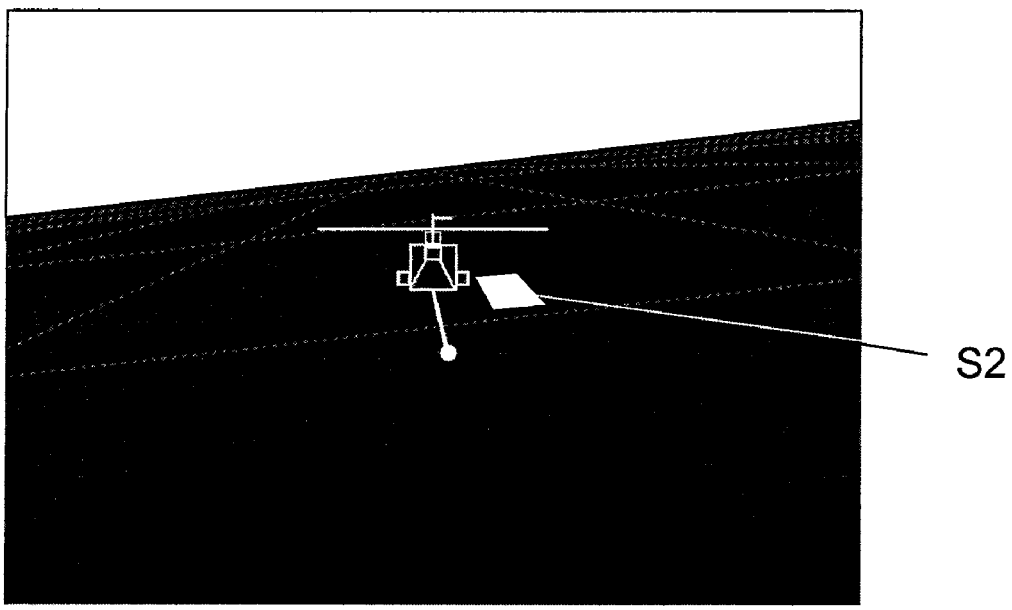

A further intuitive concept in order to provide the pilot with an assessment of the height above ground is to display a virtual shadow of the airborne vehicle on the base plane BE. In this case, the light source may either be assumed to be fixed behind the aircraft (for example at 45° azimuth and 45° elevation), or may be calculated from the actual time of day, on the basis of the GPS position and date. FIG. 5 shows a scenario such as this in the form of two instantaneous views from a different height above ground. The associated shadows are annotated S1, S2. When the height above ground decreases, the shadow moves closer to the base of the vertical. In this case, it is optional whether or not the vertical is displayed.

Figure 6:
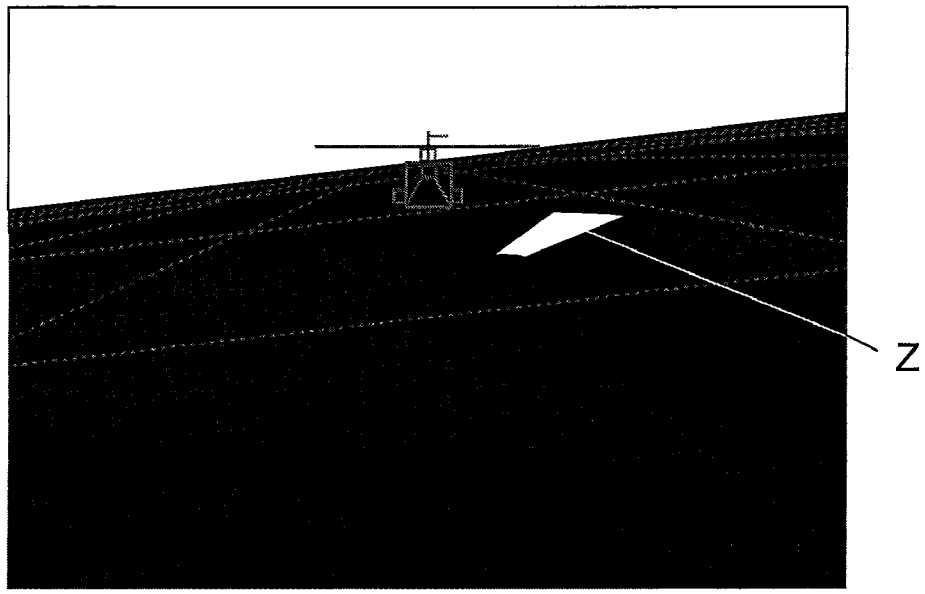
FIG. 6 shows a virtual scenario displaying a danger sector on the base plane in order to visualize moving or stationary obstructions within the landing zone.

The current sensor concepts for brown-out rescue systems assume that one necessary sensor is a dust-penetrating radar sensor. The spatial resolution of these sensors is, however, generally rather coarse (resolution in the azimuth direction ≧2°). They are therefore used as pure warning systems which are intended to display when dangerous obstructions move into the landing area during the brown out, or when the airborne vehicle is moving towards such obstructions as a result of unintentional drift within the dust cloud. In the literature, radar sensors such as these are also referred to as electronic bumpers. The information obtained using these radar sensors can be integrated in the display, in one advantageous embodiment of the invention (see FIG. 6).

The proposed display for active warning of obstructions in the landing zone can be designed in a manner that is functionally similar to motor-vehicle parking aids. The three-dimensional projection of a specific sector Z on the base plane BE on which an object has been detected is emphasized by color (danger sector display). By way of example, 4, 8 or 16 sectors may be used as lateral resolution. Since the electronic bumper in general provides no information or only a small amount of information about the actual height of the obstruction, and the projection results in uncertainty in the range measurement, the range display is split into a small number of discrete range steps (for example 3 or 4 range steps: range between current position and ½ rotor diameter, between ½ and 1 rotor diameter, between 1 and 2 rotor diameters, more than 2 rotor diameters). In addition, an audible warning can be emitted for obstructions which are closer than a predetermined multiple/fraction of the rotor diameter.

If the brown-out rescue system has a high-resolution, forward-looking 3D sensor or alternatively has access to a digital 3D terrain database, and the helicopter furthermore has a helmet mounted sight system (HMS/D), then the specific landing point or touch-down point can be visually aimed at, selected and displayed accurately in position in the display on the base plane BE, by the pilot, before a possible brown out. In order to achieve this, 3D data must be available from the area in front of the helicopter, field of view (FOV) of the HMS/D must be known, and a digital trigger input must be available. In order to mark the landing point or touch-down point, the pilot uses the HMS/D to focus on this point in the landing zone, by aiming at this point through the cockpit window and then operating the digital trigger. The current flight attitude angles of the airborne vehicle and the FOV of the HMS/D result in a three-dimensional direction vector. The landing point or touch-down point is located at the intersection of this vector with the ground surface BF determined by means of the 3D sensor or the 3D terrain database.

This landing point can in turn be displayed as a marking on the base plane BE or the ground surface BF of the virtual scenario, thus allowing pinpoint-accuracy landing following this, even in the worst brown-out dust cloud. If the actual terrain of the landing zone is sufficiently smooth and flat or if a gradient has been calculated by the evaluation of a plurality of height sensors on the aircraft, then there is no need for a 3D sensor or a 3D terrain database for pinpoint accuracy marking of the landing point or touch-down point. In this case, the base plane BE corresponds to the actual ground surface, and can be used directly for the described marking of the landing point.

Figure 7:
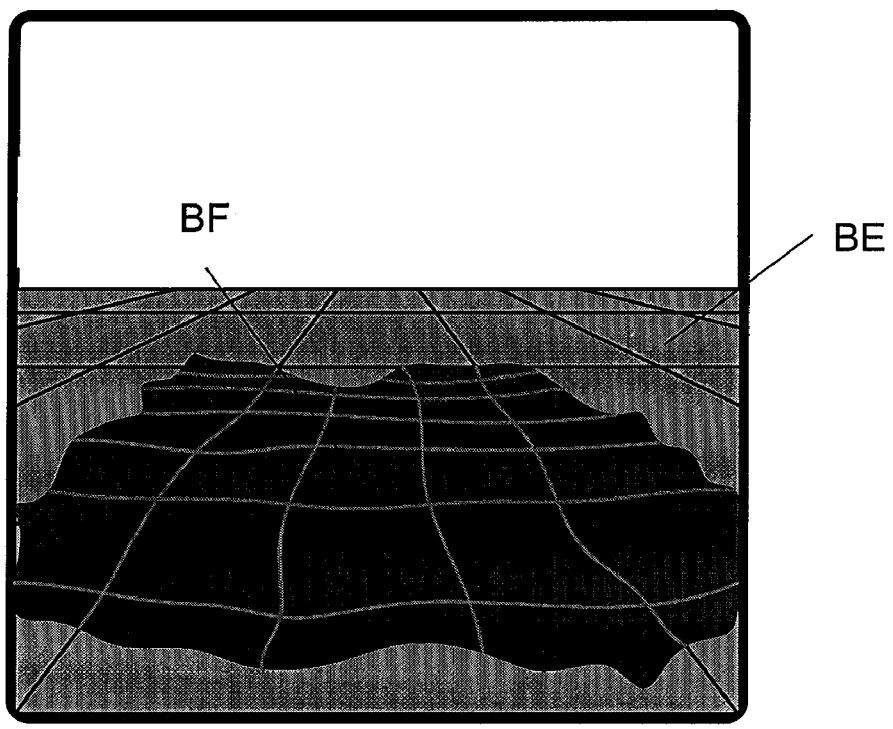
FIG. 7 shows a superimposition of the base plane and the display of the actual topographical ground surface on the basis of detailed 3D data.

If the brown-out rescue system has a high-resolution, forward-looking 3D sensor (that is to say a range image sensor), and/or it has access to the information from a digital 3D terrain and obstruction database, then a 3D display of the actual topographical terrain and of all non-ground objects can be superimposed as a further display layer on the base layer BE. FIG. 7 shows an example of this, in which the base plane BE has superimposed on it a display of the actual ground surface BF, based on 3D data.

Figure 8:
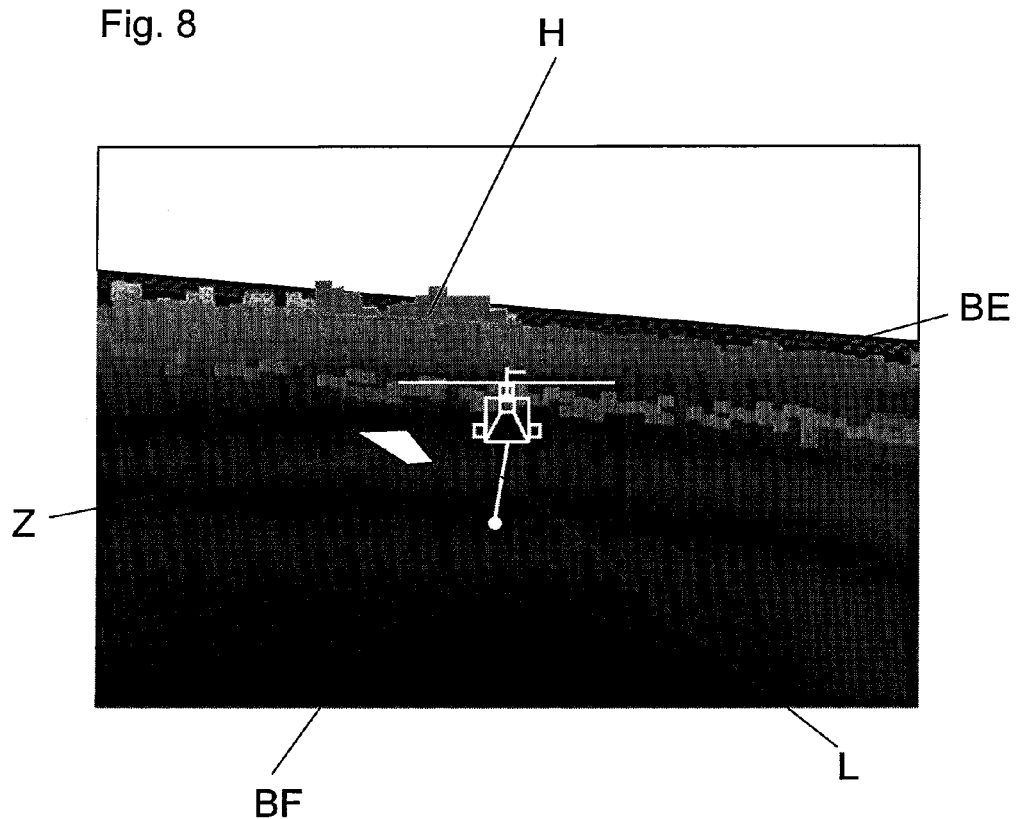
FIG. 8 shows one possible version of the virtual scenario with a display, superimposed on the base plane, of the actual area surrounding the landing zone, on the basis of 3D data.

FIG. 8 shows a virtual scenario with a base plane BE which has superimposed on it an actual topographical ground surface BF with raised non-ground objects (obstructions) H in the vicinity of the landing zone. The ground surface BF and the obstructions are displayed on a height-coded basis; that is, the color/grey-scale levels in the display correspond to the object heights with respect to the ground surface. Since, according to the invention, the ground surface BF is visualized from the perspective of a following observer, the area to the right and left and under the airborne vehicle, inter alia, can in this case also be displayed on a large scale. In addition, FIG. 8 shows a vertical L onto the ground surface BF as well as a danger sector Z based on existing obstructions.

All the graphics elements of the 3D display of the virtual scenario are updated with the aid of the instantaneous flight state data (flight attitude and velocity) as well as the instantaneous height above ground. This ensures that all the changes in the flight attitude, flight velocity, drift direction and height above ground result directly and without any noticeable time delay in a corresponding change in the 3D display of the virtual scenario. This results in a type of "virtual reality" impression in particular as if there were no visual impediment caused by the dust during the brown out. This MMI concept in conjunction with various individual components provides the pilot with a highly intuitive and natural understanding of the instantaneous flight situation, and a highly realistic impression of the actual conditions in and around the landing zone.

The display of the virtual scenario plays a major role in the spatial orientation of the pilot both for the flight attitude, drift and height control of the airborne vehicle. In reality, this display for the pilot replaces the cockpit external visibility which is lost in a brown out.

The 3D information for the ground surface BF and for non-ground objects H may originate either from a radar, an ultrasound system, a laser-based ladar or some other suitable actively measuring systems in the aircraft. This 3D information may likewise be taken from high-resolution 3D terrain and obstruction databases, and may be displayed.

One particularly suitable system for recording the 3D data which is required for the proposed brown-out MMI is, for example, the helicopter laser radar HELLAS® from the company EADS Deutschland GmbH.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A man-machine interface for assisting a pilot during take-off or landing of an airborne vehicle in reduced external visibility, said interface comprising:
   a display which represents a virtual scenario from the perspective of a virtual observer who is located behind the airborne vehicle and is in the same flight attitude as the airborne vehicle itself; wherein,
   the virtual scenario includes a base plane which symbolizes an idealized ground surface, determined from an instantaneous value of the altitude above ground and instantaneous flight attitude data of the airborne vehicle;
   the base plane is bounded by an artificial horizon and is continuously updated with instantaneous flying state data and instantaneous height of the airborne vehicle above ground;
   the virtual scenario further includes a symbol which represents the airborne vehicle;

a position of the symbol relative to the base plane represents a current flight attitude and the instantaneous height of the airborne vehicle above ground; and an instantaneous drift rate and direction of the airborne vehicle above ground are represented in the virtual scenario by perspective projection of a drift vector onto one of the base plane and a plane parallel to the base plane.

2. The man-machine interface according to claim 1, wherein a vertical from the airborne vehicle to the base plane is represented in the virtual scenario.

3. The man-machine interface according to claim 1, wherein a shadow of the airborne vehicle on the base plane is represented in the virtual scenario.

4. The man-machine interface according to claim 3, wherein the shadow is represented based on one of current time of day and a fixed position of a virtual light source.

5. The man-machine interface according to claim 1, wherein detected, a moving or static obstruction is represented in the virtual scenario by a perspective projection of a danger sector, within which said obstruction is located, on one of the base plane and a plane parallel to the base plane.

6. The man-machine interface according to claim 1, wherein:
an intended landing point on the base plane is represented in the virtual scenario; and
said position is determined by one of a helmet mounted sight, a digital trigger and flight attitude data.

7. The man-machine interface according to claim 6, wherein position is determined by also taking into consideration 3D data of land terrain.

8. The man-machine interface according to claim 6, which the base plane has superimposed on it a three-dimensional representation of an actual area surrounding the landing point, with a topographical ground surface and non-ground objects, based on data.

* * * * *